(12) United States Patent
Lindoff et al.

(10) Patent No.: US 7,680,215 B2
(45) Date of Patent: Mar. 16, 2010

(54) APPARATUS AND METHOD FOR EFFICIENT INTER RADIO ACCESS TECHNOLOGY OPERATION

(75) Inventors: Bengt Lindoff, Bjärred (SE); Johan Nilsson, Höllviken (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1014 days.

(21) Appl. No.: 11/278,878

(22) Filed: Apr. 6, 2006

(65) Prior Publication Data

US 2007/0237261 A1 Oct. 11, 2007

(51) Int. Cl.
*H03K 9/00* (2006.01)
*H04L 27/00* (2006.01)

(52) U.S. Cl. .................. 375/316; 455/436; 455/437; 455/438; 455/442; 455/443; 370/331; 370/332; 370/333; 370/334

(58) Field of Classification Search .................. None
See application file for complete search history.

(56) References Cited

U.S. PATENT DOCUMENTS

| | | | |
|---|---|---|---|
| 5,535,240 A | | 7/1996 | Carney et al. |
| 5,606,575 A | | 2/1997 | Williams |
| 5,848,097 A | | 12/1998 | Carney et al. |
| 5,991,622 A | | 11/1999 | Henry, Jr. |
| 6,052,566 A | * | 4/2000 | Abramsky et al. ........ 455/67.11 |
| 6,282,184 B1 | * | 8/2001 | Lehman et al. ............. 370/342 |
| 6,788,748 B2 | | 9/2004 | Chen et al. |
| 6,823,175 B1 | | 11/2004 | Zayana et al. |
| 6,882,628 B2 | | 4/2005 | Nakagawa et al. |
| 6,944,143 B1 | | 9/2005 | Bayley et al. |
| 7,299,021 B2 | * | 11/2007 | Pärssinen et al. ......... 455/226.1 |
| 7,324,496 B1 | * | 1/2008 | Sooch et al. ................ 370/345 |
| 2003/0119550 A1 | * | 6/2003 | Rinne et al. ................ 455/553 |
| 2005/0147192 A1 | * | 7/2005 | Yamamoto et al. .......... 375/345 |
| 2006/0135195 A1 | * | 6/2006 | Leinonen et al. ......... 455/550.1 |

FOREIGN PATENT DOCUMENTS

| | | |
|---|---|---|
| EP | 1 467 582 A1 | 10/2004 |
| EP | 1 558 050 A1 | 7/2005 |
| GB | 2 386 506 A | 9/2003 |
| JP | 2001-313545A A1 | 11/2001 |
| WO | WO9512261 A1 | 5/1995 |
| WO | WO 99/25075 A2 | 5/1999 |
| WO | WO 99/41934 | 8/1999 |
| WO | WO 03/071824 A1 | 8/2003 |
| WO | WO 2004/091241 A1 | 10/2004 |
| WO | WO 2005/048529 A1 | 5/2005 |

\* cited by examiner

*Primary Examiner*—Shuwang Liu
*Assistant Examiner*—Gina McKie
(74) *Attorney, Agent, or Firm*—Michael G. Cameron (57) ABSTRACT

An apparatus, and a method performed by the apparatus, including a terminal with a front end receiver and analog filter (AF) operable throughout a bandwidth that is large enough to cover the total bandwidth used by different access technologies that the terminal supports. The terminal is operable to simultaneously extract from the output of a single front end receiver and AF the carrier frequencies and bandwidths of the different access technologies. This permits cell evaluation activity and an ongoing communication session to be conducted simultaneously with different access technologies on different bandwidths within the bandwidth of the analog filter and without interruption of the communication session.

7 Claims, 7 Drawing Sheets

APPARATUS AND METHOD FOR EFFICIENT INTER RADIO ACCESS TECHNOLOGY OPERATION

TECHNICAL FIELD

The invention relates generally to communication systems and, more particularly, to inter radio access technology (RAT) operation in at least one communication system.

BACKGROUND

In the forthcoming evolution of cellular standards such as GSM and WCDMA, the use of additional modulation techniques such as Orthogonal Frequency Division Multiplexing (OFDM) can be expected. One proposal, referred to as Super 3G or S3G, can be seen as an evolution of the 3G WCDMA standard. Super 3G will likely use OFDM as a modulation technique, and will operate on a bandwidth that spans from 1.25 MHz to 20 MHz, with data rates up to 100 megabits per second (Mb/s) possible. Therefore, for smooth migration, within the existing radio spectrum, of the "old" cellular systems to the new high-capacity, high-data rate cellular systems, user equipment will need to be capable of operation on a flexible bandwidth.

The evolution of cellular standards will thus introduce new challenges in the design of terminals. Besides the need to support higher data rates, the variable bandwidth also puts new requirements on the receiver and transmitter. Furthermore, the mix of different access technologies within the same radio spectrum places new requirements on inter RAT operations, i.e., how the terminal handles handover (HO) and cell search among cells, including those that use different access technologies.

Conventionally, inter RAT operations involve adapting the receiver to the bandwidth and HO/cell search parameters of a certain cellular system, performing the cell search, measurements, etc., using the access technology of that cellular system, then adapting the receiver to a different access technology of another cellular system, and performing the cell search, measurements, etc., using that different access technology. During an ongoing communication session, such as a speech or data call, supported by a first access technology, if a handover to another cell that uses a second access technology becomes necessary, for reasons of capacity or coverage, the ongoing communication session is interrupted in order to permit cell search/measurements on the second access technology. In WCDMA systems, this is referred to as compressed mode, where an ongoing WCDMA communication session is interrupted so the terminal can measure on GSM. Interruptions in ongoing communication sessions reduces throughput and, with solutions such as WCDMA compressed mode, also reduce capacity. These reductions in throughput and capacity are disadvantageous from a system perspective.

Interruptions in ongoing communication sessions can be avoided if the terminal is provided with multiple receiver branches, including multiple antennas, multiple front end receivers, etc. This permits the ongoing communication session to continue on one receiver, adapted to a first access technology, while cell search/measurements are simultaneously performed using the other receiver, adapted to a second access technology. This two-receiver approach is expensive from the terminal perspective.

With Super 3G, the complexity of inter RAT operations is expected to be even greater as compared to inter RAT operations in WCDMA/GSM, because of the possibility of handovers to WCDMA/GSM on the same or adjacent carrier frequencies with different bandwidths.

It is therefore desirable to provide for an inter RAT operation that is more efficient than the conventional solutions.

SUMMARY

The present invention is an apparatus and method adapted to facilitate inter RAT operation in at least one communication system. The apparatus of the present invention includes an adjustable front-end receiver having an adjustable AF coupled to the front end receiver. Also included is an ADC coupled to the AF and a plurality of extraction units adapted to receive digital signals from the ADC. Coupled to the plurality of extraction units is a plurality of evaluation units and a plurality of detection units with a first control unit controlling a switching arrangement and fixing the frequency and bandwidths of at least one of the plurality of the extraction units based on signals received from at least one of the plurality of the evaluation units and detection units. The method of the present invention includes receiving frequency signaling throughout a first frequency bandwidth that includes a first carrier frequency and then converting the analog signal produced in the receiving step into a first digital signal that corresponds to the first frequency bandwidth. A further step is extracting from the first digital signal a secondary digital signal that is within a secondary frequency bandwidth which is equal to or within the first frequency bandwidth and which includes a secondary carrier frequency, the secondary frequency bandwidth and the secondary carrier frequency associated with communication in a first of a plurality of communication systems. While performing the step of extracting the secondary digital signal, a further step is extracting from the first digital signal at least one additional secondary digital signal that corresponds to a frequency bandwidth which is also equal to or within the first frequency bandwidth and which also includes a carrier frequency, the at least one additional secondary frequency bandwidth and its corresponding carrier frequency being associated with communication in a communication system similar to or different from that used the secondary digital signal.

DETAILED DESCRIPTION

Embodiments of the invention provide a terminal with a front end receiver operable throughout a bandwidth that is large enough to cover the entire bandwidth used by access technologies supported by the terminal. For example, in the Super 3G (S3G) case, the front end receiver would be operable across the entire 20 MHz bandwidth used by an OFDM signal, and could therefore receive a bandwidth that is larger than that of GSM (200 kHz) and WCDMA (5 MHz). In this manner, the present invention makes it possible, with only a single front end receiver, to perform HO measurements and cell searches with respect to one access technology, while simultaneously supporting, without interruption, an ongoing communication session on another access technology. It is also possible to perform HO measurements and cell searches on different access technologies, on different carrier frequencies, simultaneously, which can reduce the search time.

Figure 1A:
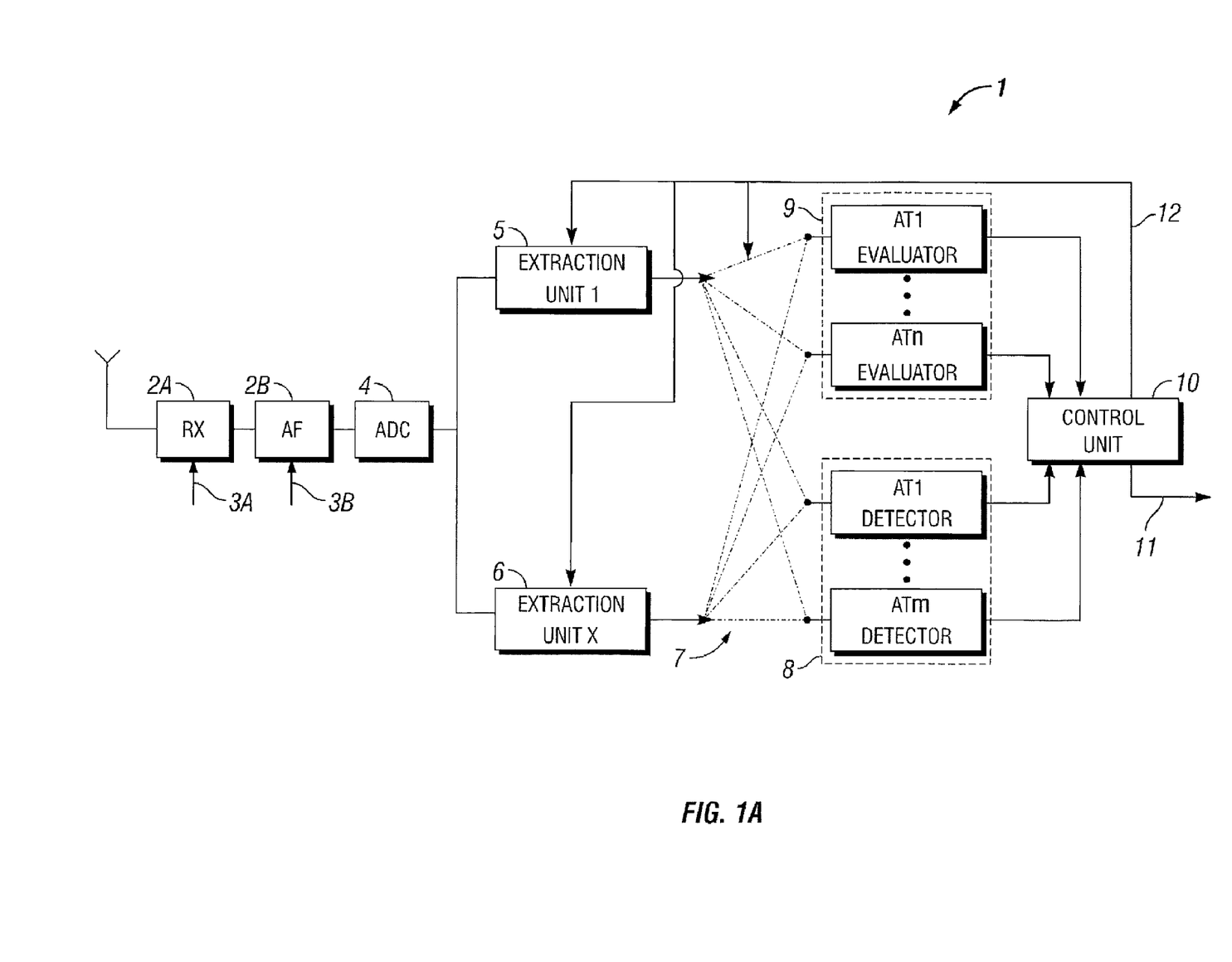
FIG. 1A diagrammatically illustrates a terminal apparatus according to embodiments of the invention.

FIG. 1A diagrammatically illustrates a terminal apparatus 1 according to embodiments of the invention. In the terminal of FIG. 1A, a front end receiver (RX) 2A is capable of receiving a signal with bandwidth $BW_0$ (e.g., 20 MHz) which can be tuned to a first carrier frequency $f_0$ and filtered via analog filter (AF) 2B. Thus, for example, the frequencies in the interval $f_0 +/- BW_0/2$ can be differentiated from unwanted signals by the front end receiver 2A and AF 2B. In some embodiments such as that described in FIGS. 4 and 6, the desired carrier frequency and bandwidth, e.g., $f_0$ and $BW_0$, are adjustable, and can be specified at inputs 3A and 3B.

Figures 1B, 2:
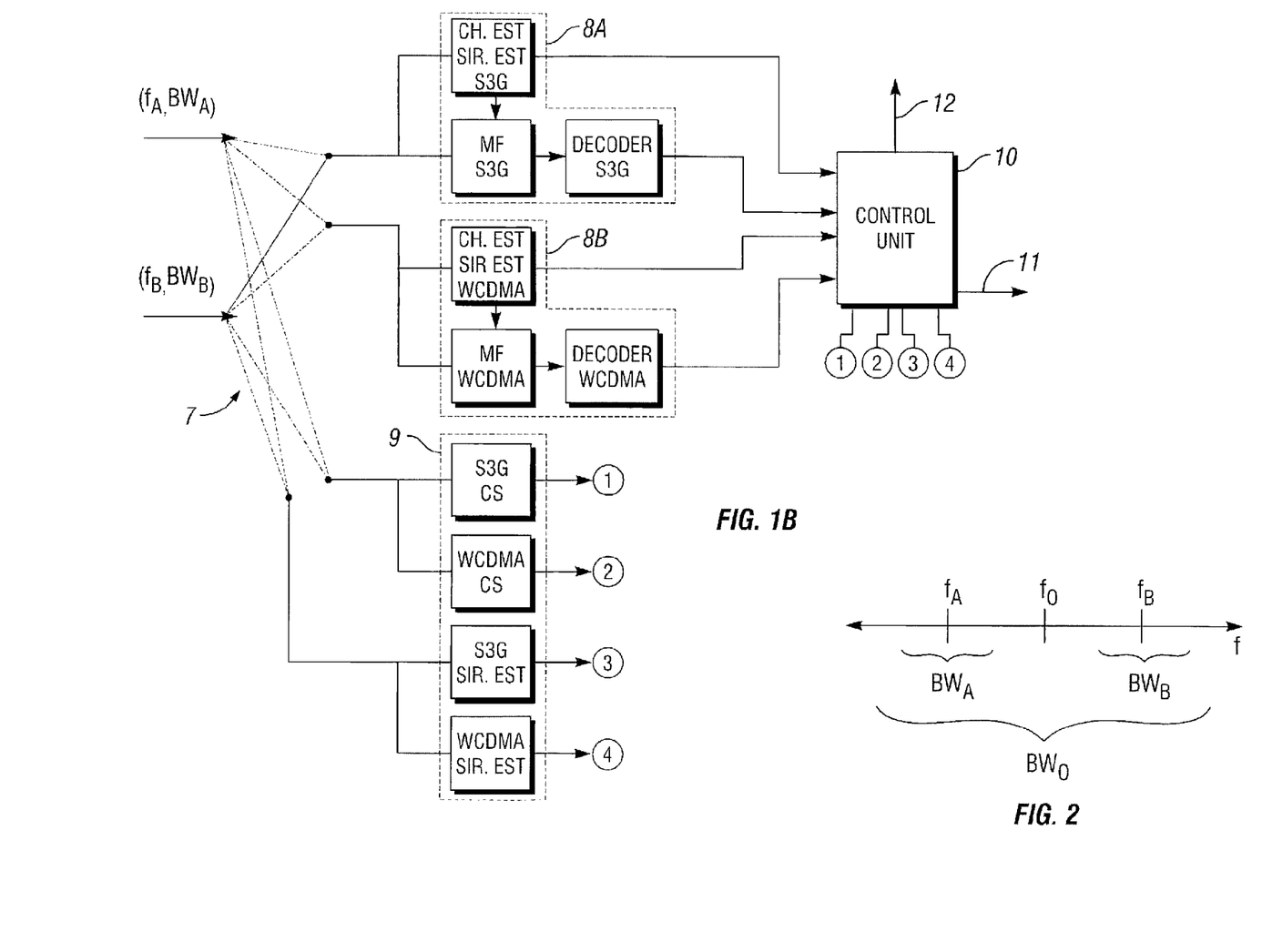
FIG. 1B diagrammatically illustrates another aspect of the terminal apparatus of FIG. 1A.
FIG. 2 graphically illustrates an example of relative portions of the frequency spectrum that can be accessed by embodiments of the invention.

The terminal of FIG. 1A is capable of communicating with a communication system A (not explicitly shown) using a carrier frequency $f_A$ and bandwidth $BW_A$, both of which are included in the aforementioned operating bandwidth of the front end receiver 2A and AF 2B, as shown in FIG. 2. The example of FIG. 2 is provided for general illustrative purposes only, and is not necessarily drawn to scale. In the front end receiver 2A and AF 2B, the input signal, at carrier frequency $f_0$ and having bandwidth $BW_0$, is down-converted to an analog baseband signal, which is then converted from analog to digital format by an analog-to-digital converter (ADC) 4. The resulting digital signal is fed to units adapted to extract signals, extraction units 5 and 6. The use of two extraction units is illustrated in the Figures, however, the present invention encompasses as many extraction units and corresponding modules as there are signals to be processed. The extraction unit 5 uses the frequency $f_A$ to down-convert the digital signal to a digital baseband signal, and also implements a low-pass filter of bandwidth $BW_A$. The use of these types of digital processing operations to extract a desired frequency carrier and bandwidth are well known in the art.

The signal extracted by extraction unit 5 is routed by a switching arrangement 7 controlled by a control unit 10 to one of a plurality of AT1-ATm detection units 8 that is adapted to the access technology used by the communication system A. For example, if communication system A uses access technology AT1 (e.g., GSM, WCDMA, OFDM-based system), then the AT1 detection unit (adapted to access technology AT1) is selected by switching arrangement 7, and if communication system A uses access technology ATm, then the ATm detection unit (adapted to access technology ATm) is selected by switching arrangement 7. In some embodiments, each of the illustrated detection units 8 is capable of performing signal detection according to techniques that are well known in the art. FIG. 1B diagrammatically illustrates in more detail the aforementioned AT1-ATm detection units 8 of FIG. 1A. FIG. 1B shows a set of detection units for S3G and WCDMA signals. Note that the present invention encompasses any number of detection units optimized for any type of signal.

The signal detected by the selected detection unit 8 is provided to first control unit 10, which forwards information contained in the detected signal for further processing at 11 as seen in FIGS. 1A and 1B. Referring back to FIG. 1A, the first control unit 10 also has a control output designated generally at 12, which is used to provide control information for the extraction units 5 and 6 and path selection information to control the operation of switching arrangement 7. Referring briefly to FIG. 3B, the control output 12 is further detailed as control output 12A, which is used to provide control information, such as the carrier frequency $f_A$ and bandwidth $BW_A$ for the extraction unit 5, and control output 12B, which is used to provide control information, such as carrier frequency $f_B$ and bandwidth $BW_B$ for the extraction unit 6, and path selection information to control the operation of the switching arrangement 7. Referring back to FIGS. 1A and 1B, the first control unit 10 also uses neighbor list information (which is conventionally available in the signal produced by the selected detection unit) to learn which carrier frequencies, bandwidths and access technologies are utilized by neighboring cells.

Using this neighboring cell information, first control unit 10 can use the control output 12 to control extraction unit 5 and switching arrangement 7 to produce desired evaluations of neighboring cells. For example, the first control unit 10 can direct the extraction unit 5 to perform generally the same operations described above with respect to extraction unit 6, but to use another carrier frequency $f_B$ and another bandwidth $BW_B$ (see also FIG. 2). Referring to FIGS. 1A and 1B, the first control unit 10 also directs switching arrangement 7 appropriately to route the output of extraction unit 5 to one of a plurality of AT1-ATn evaluation units 9 associated with the access technology (e.g., GSM, WCDMA, OFDM-based systems) used by the cell that is to be evaluated. There may be the same number, or a different number (more or less), of AT1-ATn evaluation units as there are AT1-ATm detection units. For example, if the cell uses access technology AT1, then the AT1 evaluation unit is selected, and if the cell uses access technology ATn, then the ATn evaluation unit is selected. FIG. 1B diagrammatically illustrates in more detail the aforementioned AT1-ATn evaluation units 9 of FIG. 1A. As seen therein, certain operations occur depending on the type of technology access. For a S3G signal, detector 8A performs channel estimation and determines its signal to interference ratio (SIR) (techniques well known in the art), filters the signal through a matched filter (MF) and then decodes the signal. The same operations occur in block 8B with respect to a WCDMA signal. Also, for S3G and WCDMA signals, evaluator 9 performs cell search and determines SIR in separate modules. Although FIG. 1B shows a set of evaluation units for S3G and WCDMA signals, the present invention encompasses any number of evaluation units optimized for any type of signal.

In some embodiments, each of the evaluation units 9 is capable of performing operations such as HO measurements and cell searches according to techniques that are well know in the art. In this manner, the terminal can, while simultaneously supporting an ongoing communication session with the aforementioned cell A (i.e., using extraction unit 5 as described above), perform operations such as HO measurements, cell searches, etc. with respect to communication systems in neighbor cells that use access technologies which differ from the access technology used by cell A. The ongoing communication session with cell A need not be interrupted. The evaluation results from the evaluation units are provided to the first control unit 10, and can be processed therein, or forwarded at 11 for further processing. If a new cell becomes stronger than the current cell on $f_A$, then a handover can be executed according to conventional practice. If the new cell uses an access technology that differs from the access technology of cell A, then this handover is an inter RAT handover.

Figure 3A:
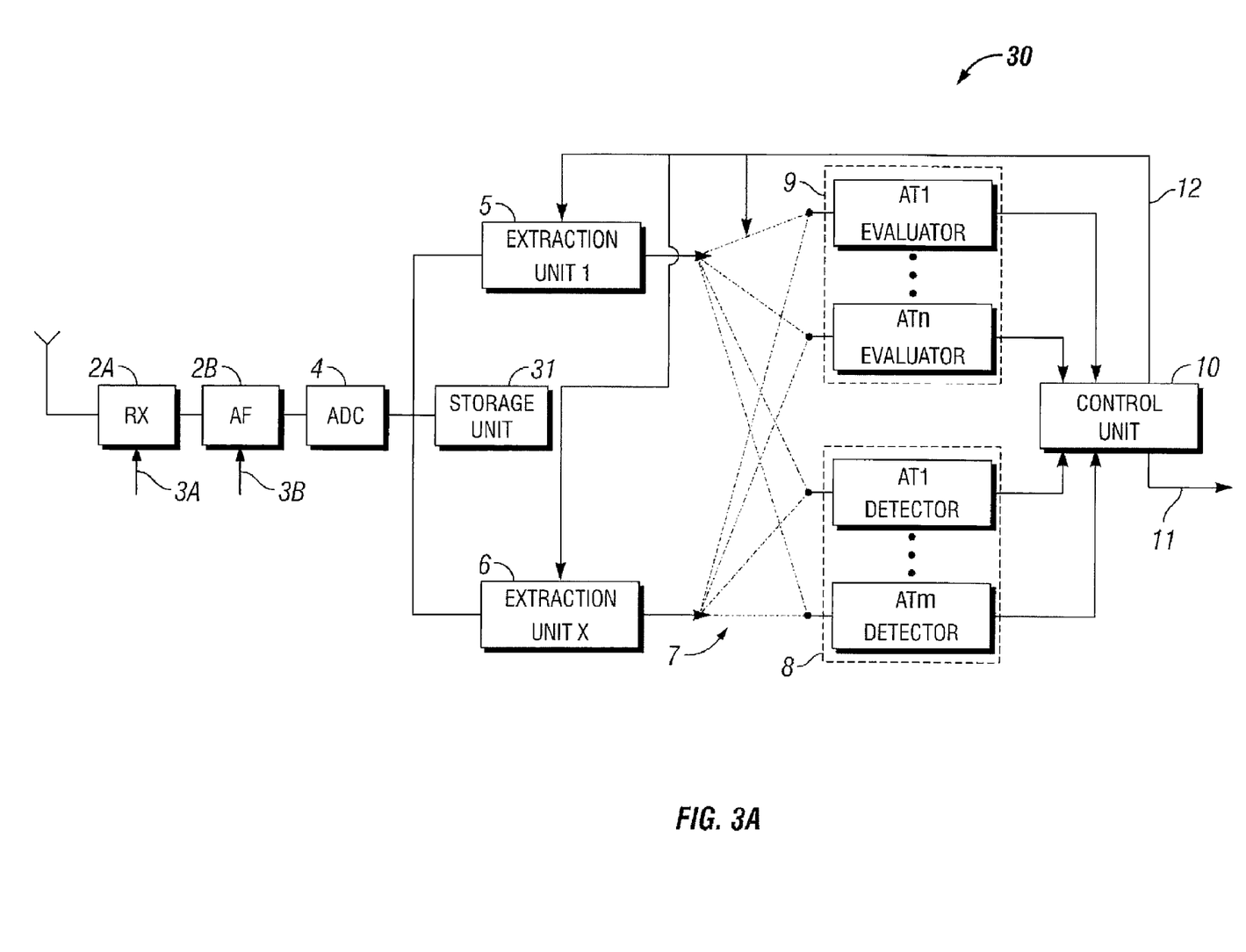
FIG. 3A diagrammatically illustrates a terminal apparatus according to further embodiments of the invention.
Figure 3B:
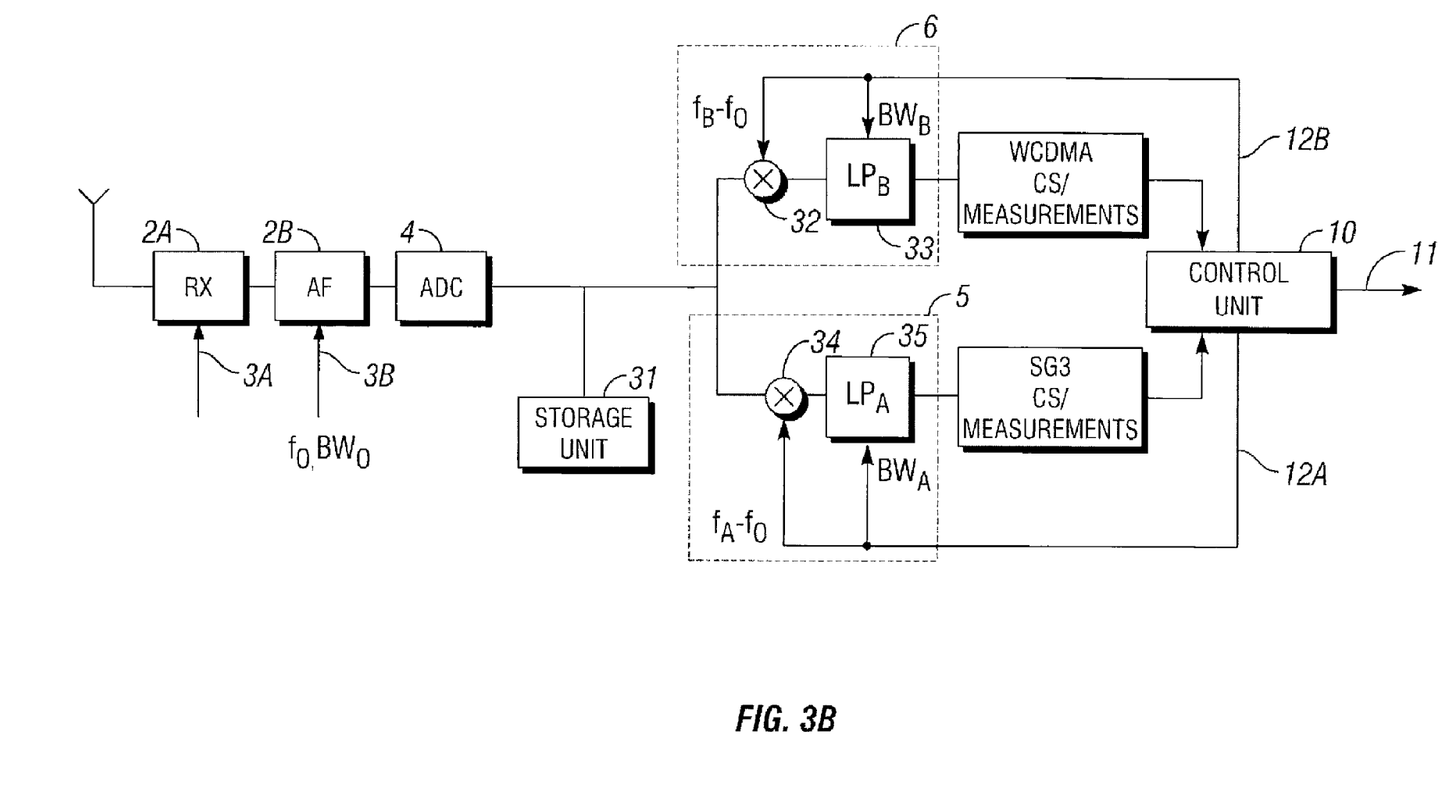
FIG. 3B diagrammatically illustrates a simplified version of the terminal apparatus of FIG. 3A.

FIG. 3A diagrammatically illustrates a terminal that is capable of efficiently performing cell evaluations while the terminal is in standby mode, according to embodiments of the invention. In standby mode, the terminal is "on", but not in use, so low power consumption is important. Typically, conventional terminals in standby mode will "wake up" periodically (e.g., once per second) and turn on its front end receiver to receive and read paging messages to determine if there are any messages for the terminal, and to perform cell measurement operations to determine whether there are any stronger cells on which to camp.

The terminal of FIG. 3A is similar to that of FIG. 1A, but includes a digital data storage unit 31 coupled to the output of the ADC 4. Each time the terminal "wakes up" to receive paging messages and perform cell measurements, the digital signaling output from the ADC 4 is stored in the storage unit 31. The first control unit 10 can use its control output 12A to effectuate the desired paging detection (e.g., detection on carrier frequency $f_A$ and bandwidth $BW_A$) via extraction unit 5 and the appropriate detection unit, in generally the same fashion as any other communication session. When the front end receiver 2A (including AF 2B) is turned off at the end of the "wake up" period, the stored digital signal can be played back, and cell evaluation operations such as those described above can be performed for any desired combinations of carrier frequency, bandwidth and access technology within the bandwidth of the analog filter. Cell evaluations can therefore continue to be performed during standby mode, without requiring any additional use of front end receiver 2A and AF 2B, and thus without increasing the power consumed by front end receiver 2A and AF 2B.

When the paging message detection is completed, there is no communication session to support during the periods between "wake ups". Accordingly, the first control unit 10 of FIG. 3A can, during those time periods, (1) control the switching arrangement 7 such that each of the extraction units 5 and 6 is coupled to a respective one of the evaluation units 9, and (2) use both extraction units 5 and 6 to support cell evaluations. Cell evaluations can thus proceed simultaneously with one another, thereby reducing the time needed to perform the cell evaluations. In some embodiments, the first control unit 10 controls the cell evaluations based on neighbor list information obtained during the paging message detection for the cell being camped on. In some embodiments, the first control unit 10 controls the cell evaluations based on information about neighbor cells derived from historical information stored in the first control unit 10. FIG. 3B diagrammatically provides a simplified version of the terminal apparatus of FIG. 3A. As seen therein, the extraction units 5 and 6 are comprised of mixers 32 and 34 and corresponding low pass filters 33 having $BW_B$ and 35 having $BW_A$. These elements are adapted to permit tuning of $f_A$ and $f_B$ in the digital domain prior to the signals being fed via the switching arrangement to the detection units 8 and evaluation units 9.

Figure 4:
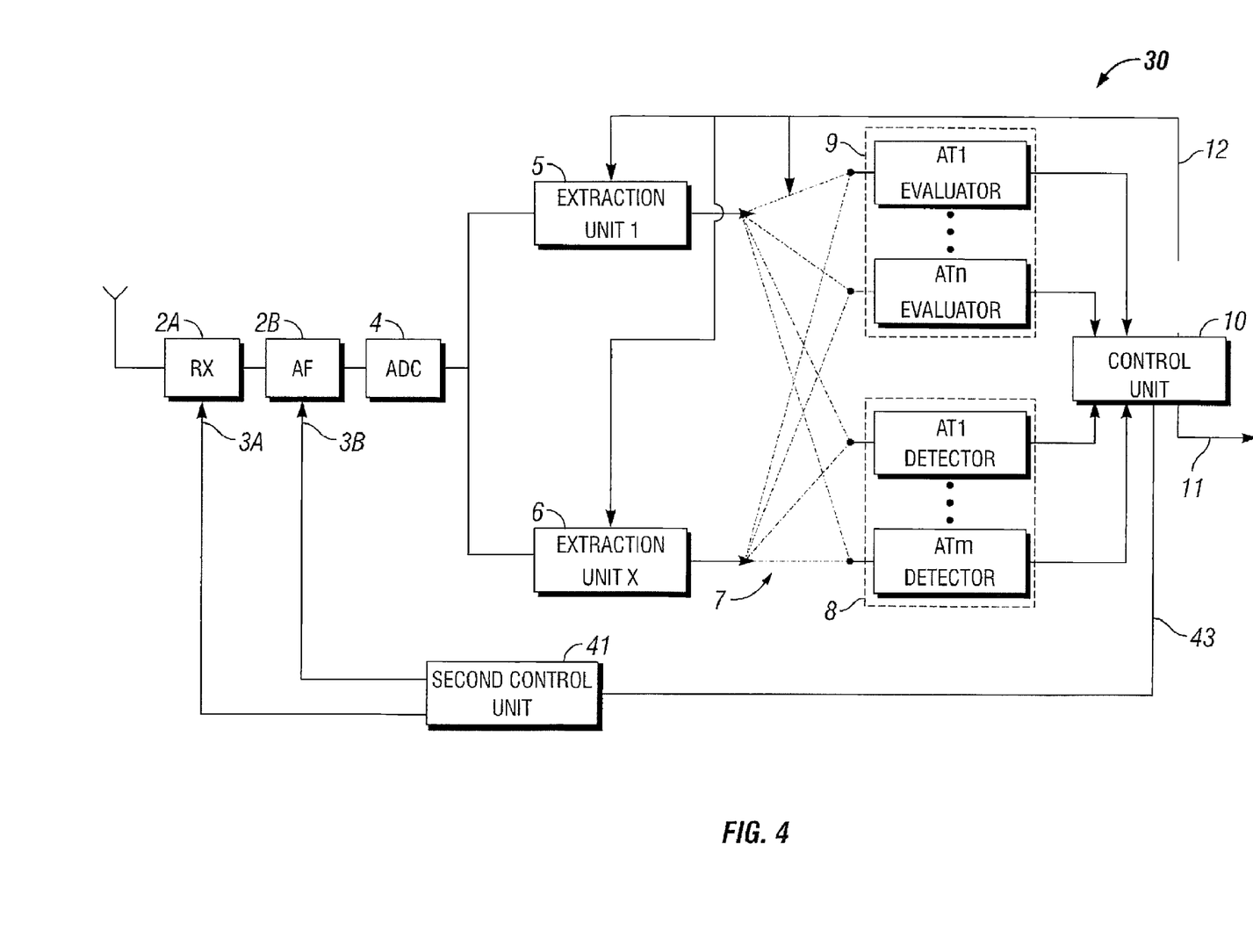
FIG. 4 diagrammatically illustrates a terminal apparatus according to further embodiments of the invention.

In some situations, very strong adjacent channel interferers can effectively prevent the use of the full bandwidth of the front end receiver 2A. If there is a strong interferer close to the desired frequency or bandwidth, a considerable portion of that interferer may need to be filtered out upstream of the ADC 4 in order to avoid dynamics problems. FIG. 4 diagrammatically illustrates a terminal that can minimize interference. The terminal of FIG. 4 is similar to those of FIGS. 1A, 1B, 3A and 3B, but includes the capability of adjusting AF 2B relative to the full bandwidth $BW_O$ capability of front end receiver 2A. For example, in some embodiments where the front end receiver 2A has a 20 MHz bandwidth capability, AF 2B is adjustable from 1.25 MHz to 20 MHz.

In FIG. 4, a second control unit 41 receives, from an output 43 of first control unit 10, conventionally available information indicative of the signal quality of the ongoing communication session, e.g., the session on $f_A$ described above. In some embodiments, this signal quality information is obtained from CQI (channel quality index) pilots in the system. The second control unit 41 continuously monitors the signal quality information, and provides to the front end receiver 2A and AF 2B control information 3A and 3B, respectively. The center frequency of the received signal is adjusted at front end receiver 2A via control information 3A and the analog selectivity filter of AF 2B is adjusted in response to the control information 3B, thereby adjusting the size of the bandwidth. In some embodiments, the carrier frequency $f_O$ and bandwidth of the receiver are initially set to $f_A$ and $BW_A$, respectively. Then, the receiver bandwidth is increased gradually, while continuing to monitor the signal quality information. This gradual increase continues until either the receiver bandwidth reaches its maximum available bandwidth, or the signal quality reaches a minimum acceptable quality threshold. In some embodiments, the threshold is a certain fraction of what the quality measure was when the bandwidth adjustment process began.

In some embodiments, adjustments of the bandwidth of front end receiver 2A are performed periodically. In some embodiments, the adjustments are performed whenever the channel quality changes suddenly. In some embodiments, the adjustments are performed whenever the terminal executes a handover.

Figure 5A:
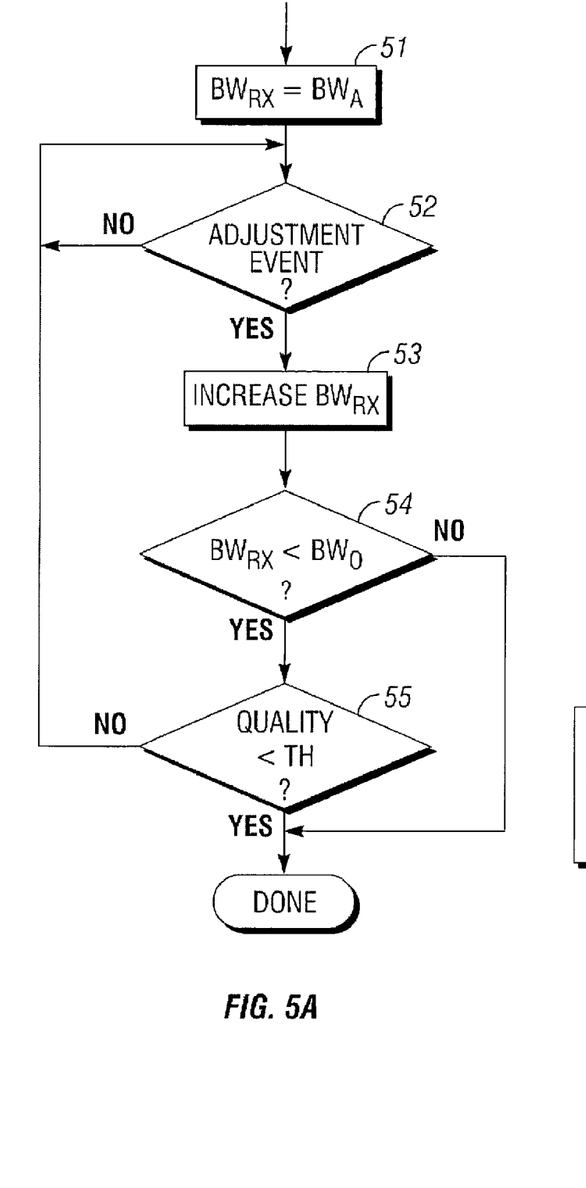
FIG. 5A is a flow chart illustrating a set of operations performed according to the invention.

FIG. 5A illustrates one of a plurality of possible bandwidth adjustment operations described above with respect to FIG. 4. Initially, at 51, the receiver's bandwidth $BW_{RX}$ is set equal to $BW_A$. When an event that triggers adjustment occurs at 52, the receiver bandwidth $BW_{RX}$ is increased at 53. The operations at 52 and 53 are repeated until either the receiver bandwidth $BW_{RX}$ reaches its maximum available bandwidth, here $BW_O$, at 54, or the signal quality reaches a minimum acceptable quality threshold TH at 55.

In some embodiments, the control information 3A directs the front end receiver 2A to adjust its carrier frequency $f_O$, in order to permit use of the receiver's entire bandwidth capability, even in the presence of strong interference. Referring to FIG. 2, this carrier frequency adjustment has the effect of shifting the bandwidth $BW_O$ relative to carrier frequency $f_A$. In some situations, the bandwidth $BW_O$ can be shifted enough to remove the problem interference with respect to carrier frequency $f_A$.

Figure 5B:
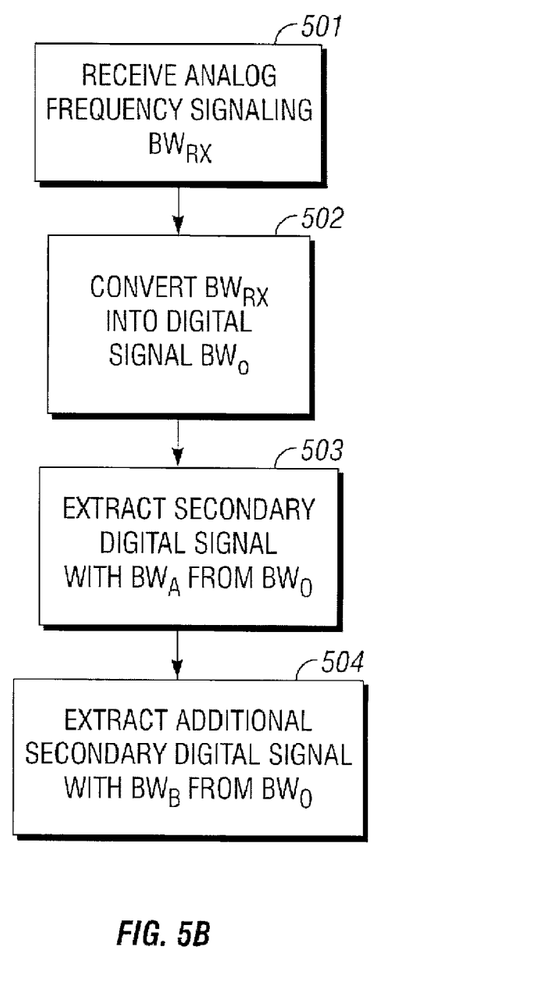
FIG. 5B is a flow chart illustrating a method of the present invention.

FIG. 5B is a flow chart illustrating a method of operating in a plurality of communication systems. As seen in step 501, a frequency signaling is received throughout a first frequency bandwidth that includes a first carrier frequency. In step 502, an analog signal produced in the receiving step is converted into a first digital signal that corresponds to the first frequency bandwidth. In step 503, a secondary digital signal that is within a secondary frequency bandwidth is extracted from the first digital signal which is equal to or within the first frequency bandwidth and which includes a secondary carrier frequency. The secondary frequency bandwidth and the secondary carrier frequency are associated with communication in a first of a plurality of communication systems. In step 504, at least one additional secondary digital signal that corresponds to a frequency bandwidth which is also equal to or within the first frequency bandwidth and which also includes a carrier frequency, is extracted from the first digital signal. The at least one additional secondary frequency bandwidth and its corresponding carrier frequency are associated with communication in a communication system similar to or different from that used the secondary digital signal. The aforementioned method can further include storing the first digital signal so that the steps of extracting the secondary digital signal and the at least one additional secondary digital signal from the stored first digital signal occur after completion of the receiving step. In addition, the receiving step can further include adjusting one of the first bandwidth and the first carrier frequency based on communication quality associated with one of the secondary carrier frequencies. For example, the receiving step can include adjusting the first bandwidth or the first carrier frequency based on communication quality associated with one of the secondary carrier frequencies. Further, the method illustrated in FIG. 5B can include performing the adjusting step at points in time that occur periodically or whenever a handover occurs.

Figure 6:
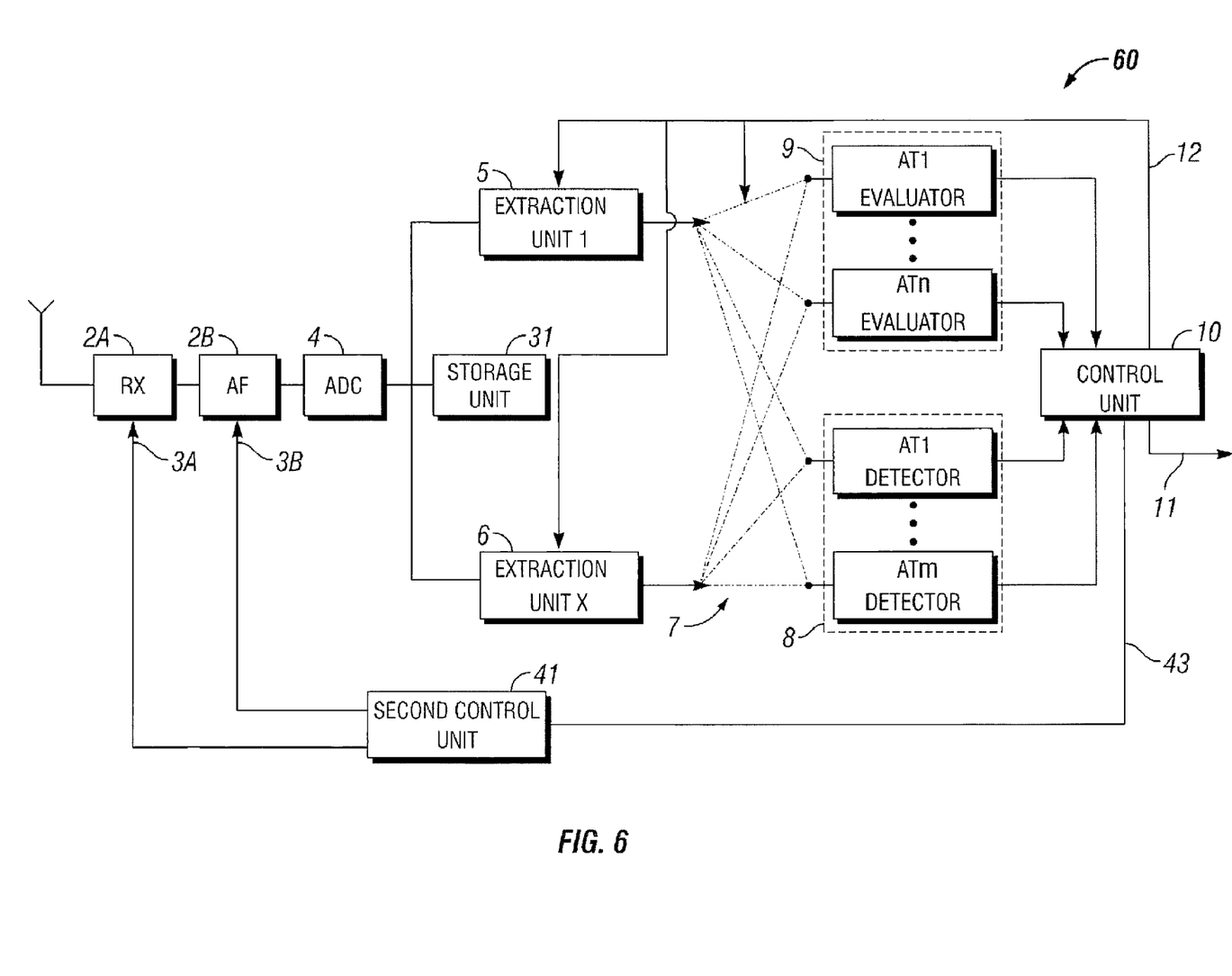
FIG. 6 diagrammatically illustrates a terminal apparatus according to further embodiments of the invention.

FIG. 6 diagrammatically illustrates a terminal according to further embodiments of the invention. The terminal of FIG. 6 is similar to those of FIGS. 1A, 1B, 3A, 3B and 4, but includes both the digital storage/playback capability described above with respect to FIG. 3A, and the front end receiver adjustment capability described above with respect to FIG. 4.

Although several embodiments of the invention have been described above in detail, this does not limit the scope of the invention, which can be practiced in a variety of embodiments.

What is claimed is:

1. An apparatus, comprising:
an adjustable front-end receiver;
an adjustable analog filter (AF) coupled to the adjustable front end receiver, wherein the adjustable front end receiver and adjustable AF are adapted to receive frequency signaling throughout a first frequency bandwidth that includes a first carrier frequency to which the adjustable front end receiver is tuned;
an analog-to-digital converter (ADC) coupled to the adjustable AF, wherein the ADC is adapted to convert an analog signal produced by the adjustable front end receiver and adjustable AF into a first digital signal within the first frequency bandwidth;
a plurality of extraction units adapted to receive the first digital signal from the ADC, each of the plurality of extraction units adapted to extract from the first digital signal, a secondary digital signal having a frequency bandwidth equal to or narrower than the first frequency bandwidth, the secondary digital signal being associated with communication in at least one of a plurality of communication systems;
a plurality of evaluation units and a plurality of detection units;
a first control unit controlling a switching arrangement and fixing the frequencies and bandwidths of at least one of the plurality of the extraction units based on signals received from at least one of the plurality of the evaluation units and detection units;
wherein each of the plurality of detection units is adapted to support a communication session in any of plurality of communication systems; and
wherein each of the plurality of evaluation units is operable, while a detection unit is supporting the communication session, to evaluate another signal as a handover candidate.

2. The apparatus of claim 1, wherein a first extraction unit is switchably coupled to at least one of the plurality of the detection units for supporting a communication session in one of the plurality of communication systems, and a second extraction unit is switchably coupled to at least one of the plurality of evaluation units for evaluating at least one signal as a handover candidate.

3. An apparatus, comprising:
an adjustable front-end receiver;
an adjustable analog filter (AF) coupled to the adjustable front end receiver;
an analog-to-digital converter (ADC) coupled to the adjustable AF;
a plurality of extraction units adapted to receive digital signals from the ADC;
a plurality of evaluation units and a plurality of detection units; and
a first control unit controlling a switching arrangement and fixing the frequencies and bandwidths of at least one of the plurality of extraction units based on signals received from at least one of the plurality of evaluation units and detection units;
a second control unit coupled between (a) the first control unit and (b) the adjustable front end receiver and adjustable AF, the second control unit adapted to adjust one of (x) the adjustable front end receiver in response to control information from the first control unit, thereby adjusting the center frequency of the bandwidth or (y) the adjustable AF in response to control information from the first control unit, thereby adjusting the size of the bandwidth.

4. The apparatus of claim 3, further comprising:
a communication apparatus for operating in a plurality of communication systems, comprising:
an adjustable front end receiver and adjustable analog filter (AF) for receiving frequency signaling throughout a first frequency bandwidth that includes a first carrier frequency to which the adjustable front end receiver and adjustable AF is tuned;
an analog-to-digital converter (ADC) coupled to the front end receiver for converting an analog signal from the adjustable front end receiver and adjustable AF into a first digital signal that is within a first frequency bandwidth;
a first extraction unit coupled to the ADC for extracting from the first digital signal a second digital signal that corresponds to a second frequency bandwidth which is equal to or within the first frequency bandwidth and which includes a second carrier frequency, the second frequency bandwidth and the second carrier frequency associated with communication in one of the plurality of communication systems; and
a second extraction unit coupled to the ADC, and operable while the first extraction unit is extracting the second digital signal, for extracting from the first digital signal a third digital signal that corresponds to a third frequency bandwidth which is equal to or within the first frequency bandwidth and which includes a third carrier frequency, the third frequency bandwidth and the third carrier frequency associated with communication in one of the plurality of communication systems;
a digital storage unit coupled to the ADC for storing the first digital signal therein and wherein the first and second extraction units receive the first digital signal from the digital storage unit while the receiver is idle;
first and second evaluation units switchably coupled to the first and second extraction units, the first and second evaluation units adapted to simultaneously evaluate signals as handover candidates while the receiver is idle; and first and second detection units switchably coupled to the first and second extraction units, the first and second detection units operable to support a communication session with one of the communication systems while the front end receiver is operating.

5. The apparatus of claim 4, further comprising:

a first control unit controlling a switching arrangement operable to switchably couple at least one of the plurality of extraction units to the at least one of the plurality of detection units and at least one of the plurality of evaluation units;

wherein at least one of the coupled detection units is operable to support a communication session with one of the communication systems while the adjustable front end receiver and adjustable AF is operating; and wherein at least one of the coupled evaluation units is operable, while the adjustable front end receiver and adjustable AF is operating and the detection unit is supporting the communication session, to evaluate other signals as handover candidates.

6. The apparatus of claim 5, further comprising a second control unit controlling the adjustable front end receiver and adjustable AF, the adjustable front end receiver and adjustable AF responsive to the second control unit for adjusting at least one of the first bandwidth and the first carrier frequency.

7. The apparatus of claim 6, wherein the second control unit controls the adjusting by the adjustable front end receiver and adjustable AF based on communication quality associated with at least one of the second and third carrier frequencies.

* * * * *

UNITED STATES PATENT AND TRADEMARK OFFICE
CERTIFICATE OF CORRECTION

| | |
|---|---|
| PATENT NO. | : 7,680,215 B2 |
| APPLICATION NO. | : 11/278878 |
| DATED | : March 16, 2010 |
| INVENTOR(S) | : Lindoff et al. |

Page 1 of 1

It is certified that error appears in the above-identified patent and that said Letters Patent is hereby corrected as shown below:

In Column 7, Line 58, in Claim 1, delete "plurality" and insert -- the plurality --, therefor.

Signed and Sealed this

Fifteenth Day of June, 2010

David J. Kappos
*Director of the United States Patent and Trademark Office*